April 7, 1964 B. G. PERSON 3,128,413

LIGHT ACTUATED SWITCH

Filed Sept. 7, 1960

INVENTOR.
Bertil G. Person
BY
[signature]
ATTORNEY.

United States Patent Office 3,128,413
Patented Apr. 7, 1964

3,128,413
LIGHT ACTUATED SWITCH

Bertil G. Person, Allegan, Mich., assignor to Com-Pak-Ett Manufacturing Company, Allegan, Mich.

Filed Sept. 7, 1960, Ser. No. 54,444
2 Claims. (Cl. 317—124)

This invention relates to improvements in light actuated switch.

The principal objects of this invention are:

First, to provide a light actuated switch in which the electrical components are conveniently mounted on a single insulated support panel and securely enclosed in a protective cover so that the assembled switch can be mounted in various angularly adjusted positions for prolonged operation without attention or access thereto.

Second, to provide a light actuated switch enclosed in a weatherproof casing and provided with a light access opening closed by a protuberant lens so that normal rain and precipitation keep the lens clean for prolonged operation of the switch without attention or cleaning.

Third, to provide a novel form of light actuated switch in which a cadmium sulphide cell is arranged to control the conductivity of an electrical circuit within a variable range of light intensities for on and off conditions of the circuit.

Fourth, to provide a light sensitive switch assembly which is relatively easy and inexpensive to assemble and which is trouble free and long lived in operation and capable of directly controlling a relatively high value of electric current.

Other objects and advantages of the invention will be apparent from a consideration of the following description and claims.

The drawings, of which there is one sheet, illustrate a highly practical commercial form of the switch assembly.

Figures 1, 2, 3, 4:
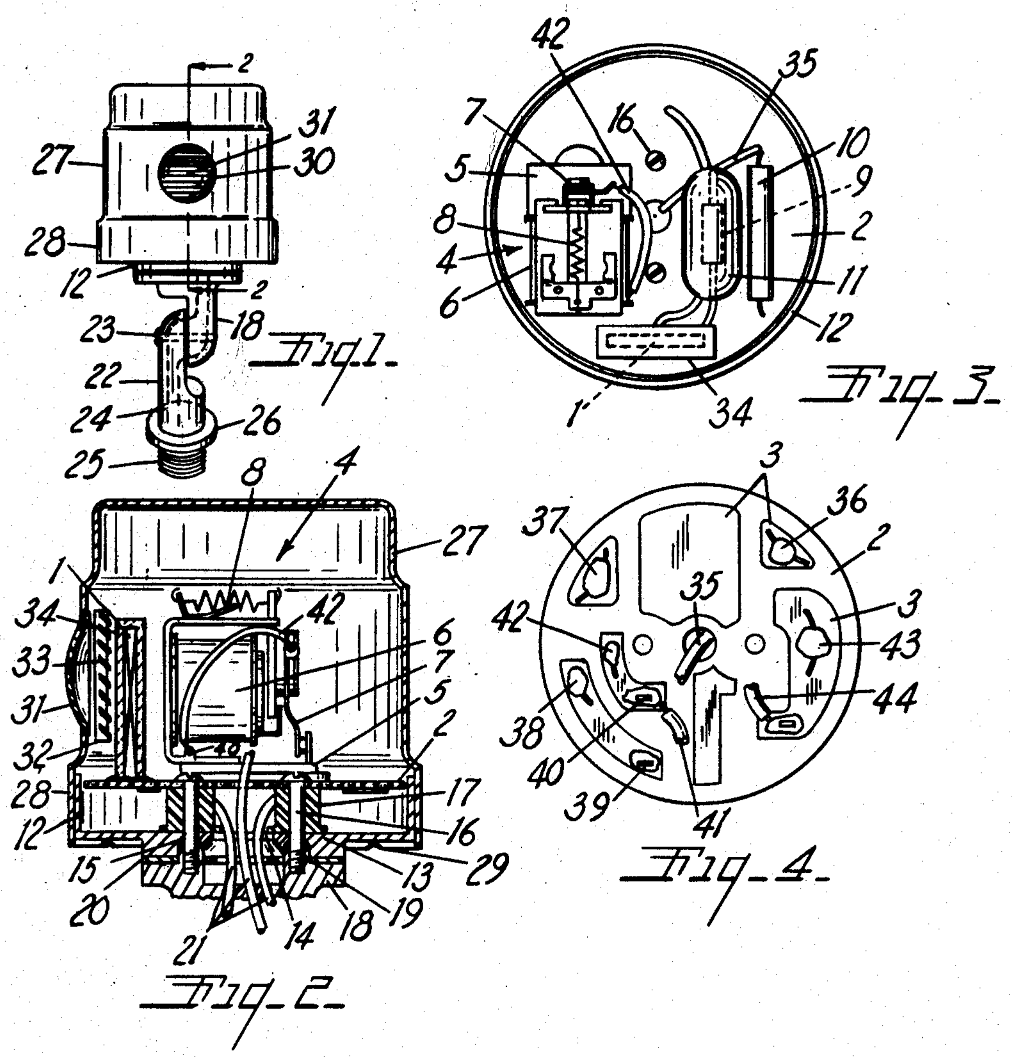
FIG. 1 is a front elevational view of the assembled switch in its enclosing case.
FIG. 2 is a fragmentary cross sectional view taken generally along the plane of the line 2—2 in FIG. 1.
FIG. 3 is a top plan view of the switch parts and base with the cover of the case removed.
FIG. 4 is a fragmentary bottom plan view of the mounting plate for the electrical elements of the switch.

The switch assembly of the present invention utilizes the well known property of a cadmium sulphide cell to become electrically conductive upon exposure to light and to become electrically non-conductive when light is excluded therefrom. Such a light sensitive cadmium sulphide cell is indicated conventionally at 1 and may be obtained from commercial sources. The cell 1 is mechanically supported upon a mounting disk or plate 2 of electrical insulating material and of circular outline.

The undersurface of the insulating mounting plate is provided with a plurality of differently shaped areas or coatings 3 of electrically conductive material which may conveniently be applied by a photo depositing process or otherwise.

Mounted alongside of the cell 1 to be regulated or controlled thereby is an electrical relay indicated generally by the reference numeral 4 and including a base plate 5, electrical coil 6, and switch terminals 7 arranged to be actuated between opened and closed positions by energization and de-energization of the coil. A spring 8 biases the terminals to one condition which in the example illustrated is the closed position of the terminals. The relay 4 is provided with fixed terminal connections which project downwardly through the insulating mount plate 2 for attachment and electrical connections to the cell 1 and other elements to be described.

Co-operating with the cell 1 and the relay 4 in the circuit of the switch assembly are a high value resistor 9, a low value resistor 10 and a condenser 11, all of which have mechanically supporting electrically conducting lead wires which project downwardly through the insulating plate 2 for connection to the conducting areas 3 and other parts of the circuit as will be described.

The insulating support plate 2 with the electrical components mounted thereon is mechanically received and supported within a small cup-shaped base 12 having a bottom wall 13 with a central hole 14 therein. A pair of similar bolt holes 15 positioned on opposite sides of the central hole 14 receive and pass mounting screws 16 which extend downwardly through the base plate through insulating mounting sleeves 17 which space the underside of the mounting plate 2 and the electrical connections thereon from the base 12. A first mounting bracket 18 has a circular upper face with projecting studs 19 on its upper surface that project into the lower ends of the holes 15 and are retainingly engaged with the threads of the screws 16. A gasket 20 may be interposed between the bracket and the base 12.

The bracket 18 is hollow to receive and pass three electrical wires indicated collectively at 21 and has a flat laterally facing surface adjustably secured against a mating surface on a second bracket 22 by means of a clamp screw 23. The tubular end 24 of the second bracket 22 has a threaded end 25 and nut 26 permitting mounting of the bracket and the switch assembly in adjusted positions on the ends of standard electrical conduits or junction boxes so that the switch assembly including the light sensitive cell 1 may be mounted in various angular positions on any desired support.

In order to enclose the switch assembly and protect it from the weather while controlling the access of light to the cell 1, the switch assembly is provided with an inverted cup-shaped hood or cover 27 having a lower flange 28 closely embracing the base 12 and crimped thereto as at 29. The side of the hood 27 defines a circular hole 30 opposite the cell 1 and the opening is closed by a protuberant lens 31. It has been found that the outwardly convex protuberant shape of the lens 31 cause normal rain and precipitation to keep the lens sufficiently clear and free from dust to permit continued operation of the cell without periodic washing of the lens or attention to the switch assembly.

In order to exclude stray light rays from unwanted sources from the cell 1 a small piece of screening 32 having plural inclined louvers 33 is mounted across the insides of the lens 31 and in front of the cell 1. Thus when the switch assembly is mounted and connected to control a floodlight in response to natural daylight and night conditions, the lens 31 and louvers 33 may be positioned by adjustment of the switch assembly to exclude light from the floodlights actuated by the switch so that the switch will function solely in response to natural daylight.

In order to extend or broaden the range of light intensities which will actuate the cell 1 between conductive and non-conductive conditions, the cell 1 is enclosed in a transparent capsule 34 the color of which may be selected within a range varying from clear white to dark blue or blue green. The darker the tint of the capsule 34, the higher the level of light intensity necessary to render the cell conductive once it has been rendered non-conductive. This makes the switch assembly as a whole less critical to the external light conditions which actuate it.

Figure 5:
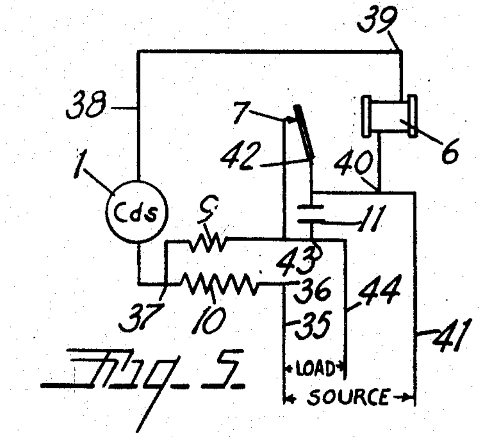
FIG. 5 is a schematic wiring diagram of the electrical circuit of the switch.

The electrical circuits and connections of the switch assembly are shown most clearly in FIGS. 4 and 5 in which one wire 35 extends both from a source and the load to be controlled upwardly through the central opening in the insulating plate 2 for connection to one end of the low value resistor 10. The connected ends of the wire 35 and resistor 10 are secured together by soldering to one of the conducting areas 3 as at 36. The other end of the resistor 10 is connected to one end of the resistor 9 and to one lead of the light sensitive cell by soldering as at 37. The opposite side of the cell is electrically connected to a conducting strip at 38 and electrically connected to one terminal of the coil 6 at 39. The other side of the coil 6 is connected through a terminal connection 40 to a wire 41 extending to the source of the current to be controlled. The connection 40 is also connected at 42 to the moveable element of the switch terminals 7 and to one side of the condenser 11. The other side of the condenser 11 is connected at 43 to the previously described end of the low value resistor 10 and a wire 44 connected to the other side of the load to be controlled by the switch.

The method of operation of the switch and its circuit is well known. When the presence of light on the cell 1 renders the cell conductive, the relay coil 6 is energized to open the relay terminals 7 thus interrupting the supply of current through the wires 41 and 44 to the part being controlled. When the absence of light on the cell 1 renders it non-conductive, the terminals 7 are closed to energize the part controlled.

I have illustrated and described my invention in a highly practical embodiment thereof. I have not attempted to illustrate or describe other adaptations or embodiments which I contemplate, as I believe this disclosure will enable those skilled in the art to embody or adapt my invention as may be desired.

Having thus described the invention, what is claimed as new and desired to secure by Letters Patent is:

1. In a light sensitive switch the combination of a light sensitive cell having reduced electrical resistance when subjected to light, a capsule of tinted light filtering transparent material fitted over the top, sides and edges of the cell and enclosing said cell, a casing covering said cell and having a hole directing light to the cell from a single direction through said capsule, a solenoid coil, a switch arm carrying a normally closed switch contact and positioned to be moved to switch opening position by energization of said coil, a first circuit from a power source connected through a load to be controlled and said switch in series, a control circuit connected across said source ahead of said switch and including a relatively large resistance and said cell and said coil in series, a condenser bridging said switch, and a second relatively small resistor connected at one end to said second circuit between said large resistor and said cell and at its other end to said first circuit between said switch and said load.

2. In a light sensitive switch the combination of a light sensitive cell having reduced electrical resistance when subjected to light, a casing covering said cell and having a hole directing light to the cell from a single direction, a solenoid coil, a switch arm carrying a normally closed switch contact and positioned to be moved to switch opening position by energization of said coil, a first circuit from a power source connected through a load to be controlled and said switch in series, a control circuit connected across said source ahead of said switch and including a relatively large resistance and said cell and said coil in series, a condenser bridging said switch, and a second relatively small resistor connected at one end to said second circuit between said large resistor and said cell and at its other end to said first circuit between said switch and said load.

References Cited in the file of this patent

UNITED STATES PATENTS

| | | |
|---|---|---|
| 2,182,987 | Hopkins | Dec. 12, 1939 |
| 2,207,097 | Logan | July 9, 1940 |
| 2,871,371 | Gray | Jan. 27, 1959 |
| 2,898,525 | Jacobs | Aug. 4, 1959 |
| 2,978,591 | Ringger | Apr. 4, 1961 |